United States Patent [19]

Berde et al.

[11] Patent Number: 4,618,889
[45] Date of Patent: Oct. 21, 1986

[54] VIDEO COLOR TRANSMISSION SYSTEM WITH INDEPENDENT AUDIO SIGNALS WITHIN THE VIDEO SIGNALS

[75] Inventors: Dennis Berde, Plainview; Edward Youskites, Melville, both of N.Y.

[73] Assignee: Grumman Aerospace Corporation, Bethpage, N.Y.

[21] Appl. No.: 748,759

[22] Filed: Jun. 26, 1985

Related U.S. Application Data

[63] Continuation of Ser. No. 439,165, Nov. 4, 1982, abandoned.

[51] Int. Cl.⁴ ............................................. H04N 7/04
[52] U.S. Cl. ................................. 358/144; 358/143
[58] Field of Search ............... 358/144, 143, 142, 342, 358/146; 381/1, 2

[56] References Cited

U.S. PATENT DOCUMENTS

4,321,623  3/1982  Rzeszewski .................... 358/144
4,405,944  9/1983  Eilers et al. .................... 358/144
4,446,488  5/1984  Suzuki ........................ 358/144 X Primary Examiner—Howard W. Britton
Assistant Examiner—Victor R. Kostak
Attorney, Agent, or Firm—Richard G. Geib; Daniel J. Tick; Bernard S. Hoffman

[57] ABSTRACT

A transmitter for producing video and audio signals and transmitting the signals includes an encoder for encoding stereo audio signals with the video signals. The audio signals encoded by the encoder constitute a broadband audio signal of approximately 15 kHz. A receiver for converting signals received from the transmitter to a picture and stereo sound includes a decoder for deriving the stereo audio signals from the received signals.

22 Claims, 9 Drawing Figures

FIG.1

(L-R) SAMPLER
FIG. 2

FIG. 3

MATRIX CIRCUIT
FIG. 4

SYNC GENERATOR, VIDEO PROCESSING AMPLIFIER
AND COLOR ENCODER
FIG. 5

AUDIO (L-R) DESAMPLER
FIG.6

L/R DECODER
FIG.7

TIMING CIRCUIT II
FIG.8

TIMING CIRCUIT 80
FIG.9

VIDEO COLOR TRANSMISSION SYSTEM WITH INDEPENDENT AUDIO SIGNALS WITHIN THE VIDEO SIGNALS

This is a continuation of application Ser. No. 439,165, filed Nov. 4, 1982, and now abandoned.

BACKGROUND OF THE INVENTION

The present invention relates to a video transmission system. More particularly, the invention relates to a video color transmission system with stereo audio.

There are known video transmission systems which include stereo audio channels. The known systems require considerable modification of existing network distribution equipment and considerable modification of existing transmitters and are therefore costly in manufacture.

The principal object of the invention is to provide a video color transmission system which provides stereo audio without modification of existing network distribution equipment.

An object of the invention is to provide a video color transmission system which provides stereo audio without modification of existing transmitters.

Another object of the invention is to provide a video color transmission system which utilizes a standard system with very minor modifications to provide stereo audio.

Still another object of the invention is to provide a video color transmission system which provides stereo sound in an inexpensive manner.

Yet another object of the invention is to provide a video color transmission system which provides stereo sound with efficiency, effectiveness and high fidelity.

BRIEF SUMMARY OF THE INVENTION

In accordance with the invention, a video transmission system comprises a transmitter for producing video and audio signals and transmitting the signals. The transmitter includes an encoder for encoding stereo audio signals with the video signals. A receiver converts signals received from the transmitter to a picture and stereo sound. The receiver includes a decoder for deriving the stereo audio signals from the received signals.

The audio signals encoded by the encoder constitute a broadband audio signal of approximately 15 kHz.

The transmission system constitutes a video color transmission system and the picture produced by the receiver comprises a color picture.

The encoder comprises an audio encoder for converting left and right microphone stereo audio signals L and R to a sum audio signal (L+R) of the left and right signals and a difference audio signal (L−R) of the left and right signals.

The encoder further comprises an (L−R) sampler for sampling the difference audio signal (L−R) at a rapid rate.

The (L−R) sampler of the encoder provides three samples within a horizontal time rate of 63.5 microseconds and the samples provide for a bandwidth of substantially 15 kHz.

The (L−R) sampler of the encoder includes a plurality of sample and hold circuits and a timing circuit electrically connected to the sample and hold circuits for causing the sample and hold circuits to provide equally spaced samples approximately every 21 microseconds within the time period of a single horizontal line.

The encoder further comprises a color encoder electrically connected to the (L−R) sampler and receiving the samples provided by the sampler as Red, Green and Blue inputs, a video processing amplifier electrically connected to the color encoder and a sync generator also electrically connected to the color encoder. The color encoder, video processing amplifier and sync generator process the samples into a composite video signal. The encoder further comprises a switching circuit. Program video and the processed samples are both applied to the switching circuit. The switching circuit inserts the processed samples into the program video signal and provides a composite program video signal encoded with the difference audio signal (L−R).

The decoder comprises an audio (L−R) desampler for receiving Red, Green and Blue signals derived from, and corresponding to, the samples and converting the signals to an amplified difference audio signal (L−R).

The audio (L−R) desampler includes a plurality of sample and hold circuits, a timing circuit electrically connected to the sample and hold circuits for causing the sample and hold circuits to provide recombined audio samples, a filter electrically connected to the sample and hold circuits and the timing circuit for passing the difference audio signal (L−R) and an amplifier electrically connected to the filter for amplifying the difference audio signal.

The receiver further includes circuitry for recovering from the composite program video signal the sum audio signal (L+R). The decoder further comprises an L/R decoder electrically connected to the receiver for converting the amplified difference audio signal (L−R) and the sum audio signal (L+R) of the receiver to the left and right microphone stereo audio signals L and R.

The receiver further includes a stereo amplifier electrically connected to the L/R decoder, a left speaker electrically connected to the stereo amplifier for reproducing the left audio signals L and a right speaker electrically connected to the stereo amplifier for reproducing the right audio signals R.

BRIEF DESCRIPTION OF THE DRAWINGS

In order that the invention may be readily carried into effect, it will now be described with reference to the accompanying drawings, wherein.

DETAILED DESCRIPTION OF A PREFERRED EMBODIMENT

Figure 1:
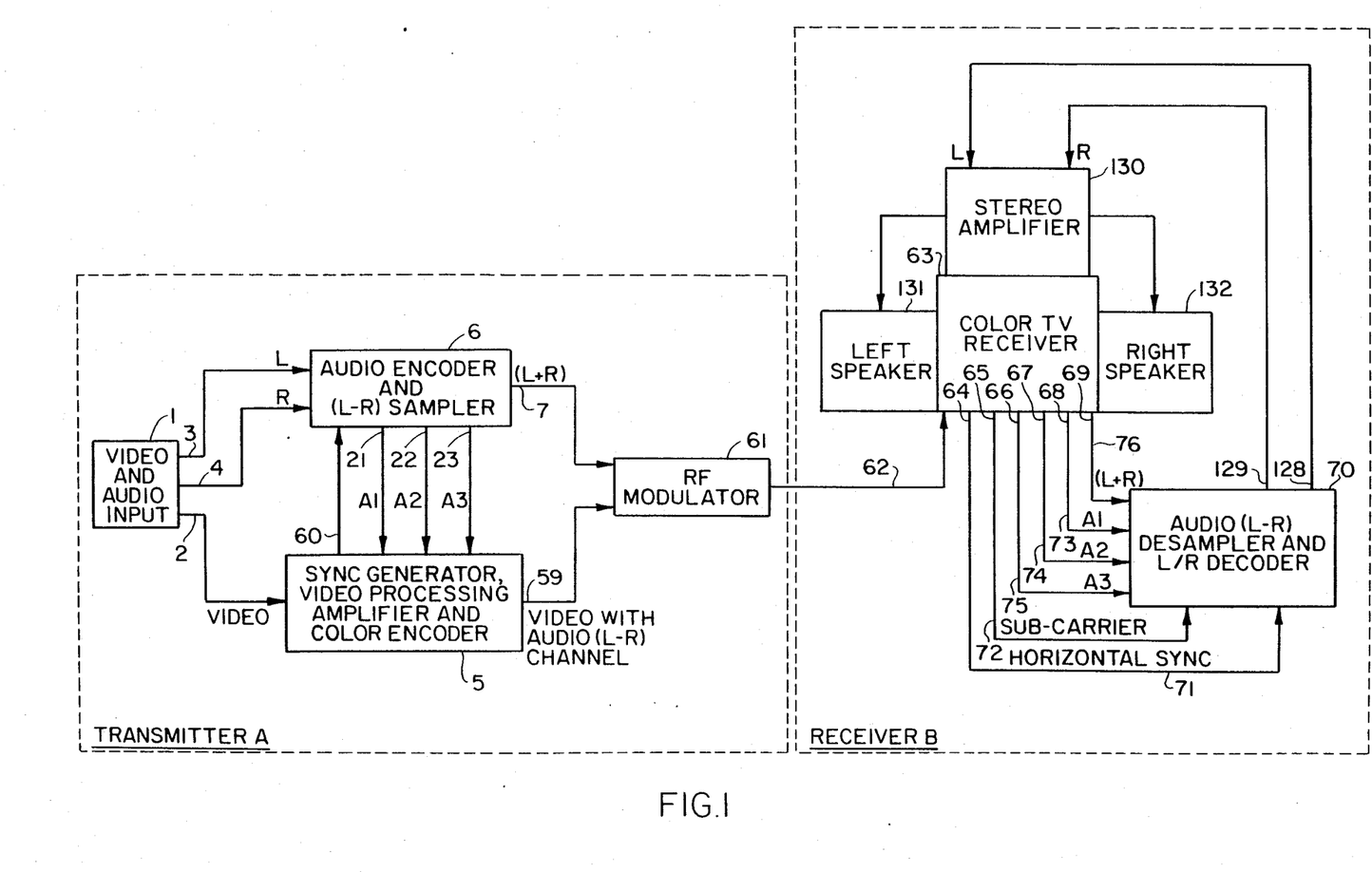
FIG. 1 is a block diagram of an embodiment of the video color transmission system of the invention.

The video color transmission system of the invention has a transmitter A and a receiver B. FIG. 1 shows both the transmitter A and the receiver B. In the embodiment of FIG. 1, in the transmitter, any suitable video and stereo audio input 1 such as, for example, live TV camera and microphone output, video and audio tape output, and the like, is supplied and provides the outputs 2, 3 and 4. A standard composite video signal is supplied via the output 2 to a first input of a combined sync generator, video processing amplifier and color encoder 5. A stereo audio signal L, representing the left microphone of a stereo system, is supplied via the output 3 to a first input of an audio encoder and (L−R) sampler 6. A stereo audio signal R, representing the right microphone of the stereo system, is supplied via the output 4 to the second input of the audio encoder and (L−R) sampler 6.

The audio encoder of the circuit 6 processes the left and right stereo audio signals L and R, respectively, by converting these signals into the sum and difference signals (L+R), provided at a first output 7 of said circuit, and (L−R), respectively. The audio encoder of the circuit 6 consists of any suitable circuitry, known and commercially available, currently utilized for FM stereo transmissions.

In accordance with the invention, the (L−R) sampler of the circuit 6 samples the (L−R) audio signal at a rapid rate. The (L−R) sampler of the circuit 6 utilizes a sampling technique to convert the (L−R) audio signal to a format which may be encoded into a video signal. The sampling technique at a rate of 3H is utilized to provide sufficient bandwidth. H is the horizontal time rate. In accordance with the Nyquist theorem, three samples within the horizontal time rate of 63.5 microseconds provide for a bandwidth of 15 kHz.

Figure 2:
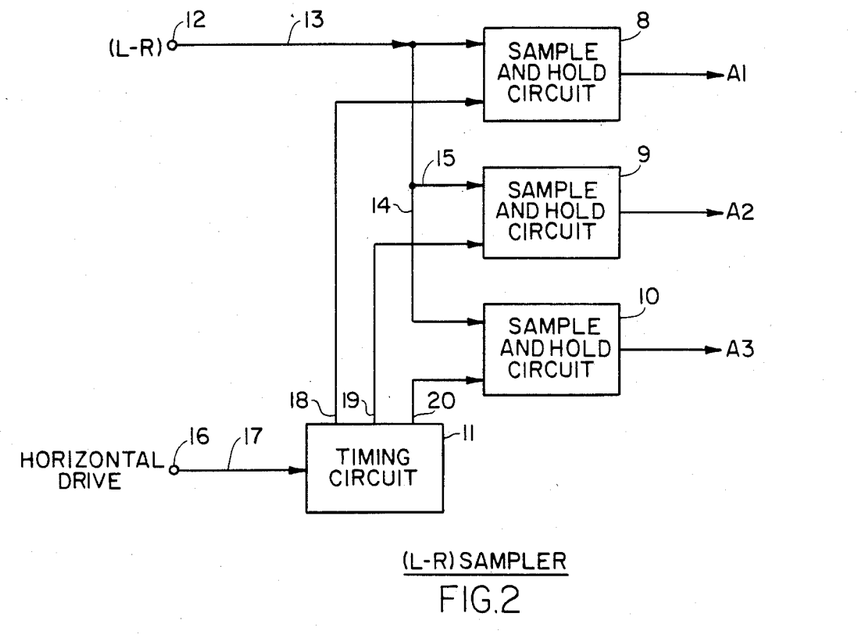
FIG. 2 is a block diagram of an embodiment of the (L−R) sampler of FIG. 1.

Am embodiment of the (L−R) sample of the circuit 6 is shown in FIG. 2 and comprises three sample and hold circuits 8, 9 and 10 and a timing circuit 11. The difference signal (L−R) produced by the audio encoder of the circuit 6 is fed to the sample and hold circuits 8, 9 and 10 via an input terminal 12 and electrical conductors 13, 14 and 15 (FIG. 2). Sampling commands are derived from the horizontal drive by the timing circuit 11 via an input terminal 16 and an electrical conductor 17. The horizontal drive supplied via the input terminal 16 is a signal which determines the time of one horizontal line in a standard TV picture.

Figure 8:
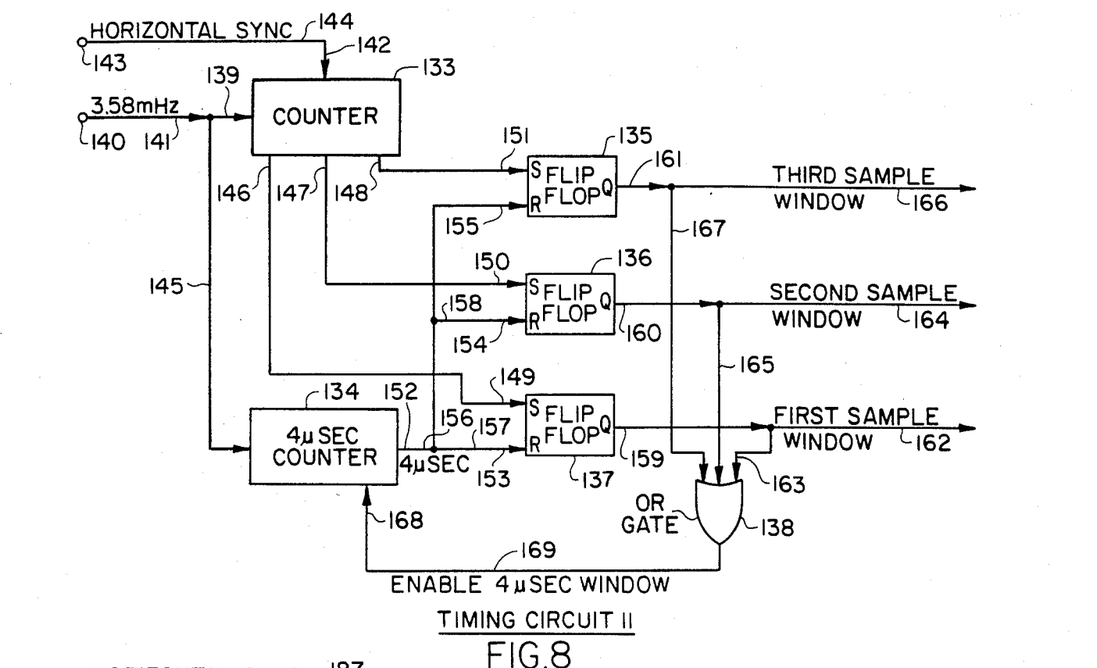
FIG. 8 is a block diagram of an embodiment of the timing circuit 11 of the (L−R) sampler shown in FIG. 2.

An embodiment of the timing circuit 11 is shown in FIG. 8 and is described hereinafter with reference to said FIG. First, second and third outputs 18, 19 and 20, respectively, of the timing circuit 11 are connected to second inputs of the first, second and third sample and hold circuits 8, 9 and 10, respectively, and provide samples every 21 microseconds. The sample and hold circuits 8, 9 and 10 may comprise any suitable known sample and hold circuits, which are commercially available as such, and produce at their outputs audio samples A1, A2 and A3, respectively.

Figure 3:
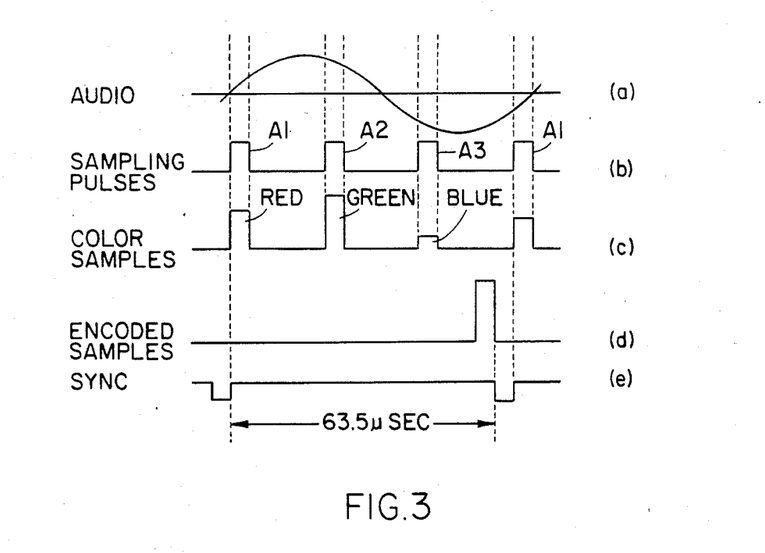
FIG. 3 is a graphical presentation explaining the operation of the (L−R) sampler.

The timing circuit 11 is thus utilized to derive three equally spaced samples within the time period of a single horizontal line, as shown in FIG. 3. In FIG. 3, the audio signal is illustrated in (a), the sampling pulses for A1, A2 and A3 are shown in (b), the color samples are shown in (c), the samples transmission window is illustrated in (d) and the sync pulses are shown in (e). As shown in FIG. 3(a) and FIG. 3(b), samples of the (L−R) audio signal are taken during each of the three sample periods of each horizontal line. These samples are held by the sample and hold circuits 8, 9 and 10 of FIG. 2 and are outputted to the color encoder circuit for further processing.

The audio samples A1, A2 and A3 are then treated as Red, Green and Blue video signals, as shown in FIG. 3(c). The amplitudes of the color samples of FIG. 3(c) for Red, Green and Blue, respectively, represent the instantaneous values of the (L−R) audio signal. These color samples are inputs to the color encoder circuit of FIG. 4, where they are processed into a composite video signal. The matrixing method utilized is the standard one used in the NTSC television system (FIG. 4).

The three samples A1, A2 and A3 produced by the (L−R) sampler of the circuit 6 are provided at first, second and third outputs, 21, 22 and 23, respectively, of the audio encoder and (L−R) sampler circuit 6 and are fed to second, third and fourth inputs of the combined sync generator, video processing amplifier and color encoder 5. The outputs 21, 22 and 23 coincide with the outputs of the (L−R) sampler of the circuit 6. The circuit 5 matrixes the three audio samples A1, A2 and A3 into a composite video signal in the same manner that Red, Green and Blue video signals are matrixed, as shown in FIG. 4.

Figure 4:
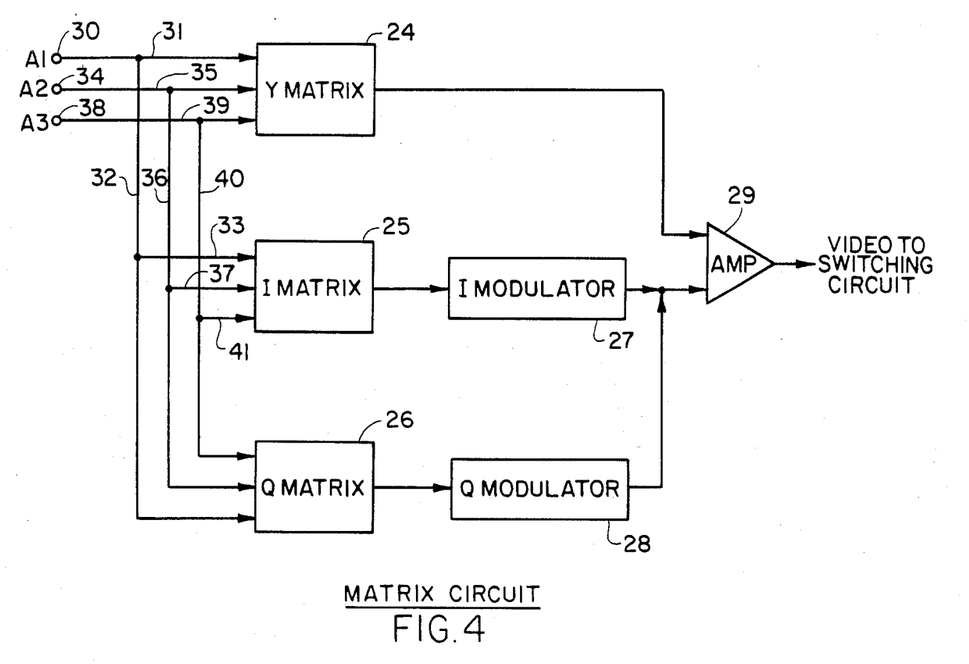
FIG. 4 is a block diagram of an embodiment of the color encoder circuit of FIG. 1.

FIG. 4 shows an embodiment of the matrix circuit of the color encoder of the circuit 5. The matrix circuit of the color encoder of the circuit 5 comprises a Y matrix 24, an I matrix 25, a Q matrix 26, an I modulator 27, a Q modulator 28 and an amplifier 29, each of which may comprise any suitable known circuit, commercially available, for accomplishing the desired purpose. The sample A1 is fed to a first input of each of the Y matrix 24, the I matrix 25 and the Q matrix 26 via an input terminal 30 and electrical conductors 31, 32 and 33. The sample A2 is fed to a second input of each of the Y matrix 24, the I matrix 25 and the Q matrix 26 via an input terminal 34 and electrical conductors 35, 36 and 37. The sample A3 is fed to a third input of each of the Y matrix 24, the I matrix 25 and the Q matrix 26 via an input terminal 38 and electrical conductors 39, 40 and 41.

The output of the Y matrix 24 is fed to a first input of the amplifier 29. The output of the I matrix 25 is used to modulate a properly phased subcarrier in the I modulator 27 and is subsequently fed to a second input of the amplifier 29. The output of the Q matrix 26 is used to quadrature modulate the same subcarrier in the Q modulator 28 and is subsequently fed to the second input of the amplifier 29 in common with the modulated output of the I matrix 25, as shown in FIG. 4. The circuit of FIG. 4 thus functions to encode the audio samples A1, A2 and A3 into a standard video format at the output of the amplifier 29.

Figure 5:
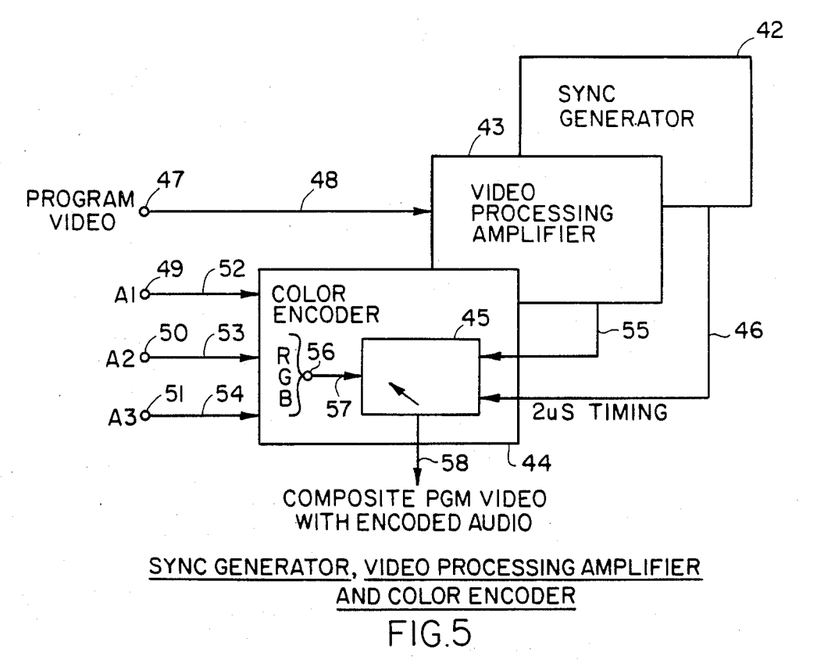
FIG. 5 is a block diagram of an embodiment of the sync generator, video processing amplifier and color encoder of FIG. 1.

The encoded audio samples are joined with the video in the circuit 5 at the end of each horizontal line. This is achieved by synchronized timing derived from the sync generator timing pulses. FIG. 5 shows an embodiment of the sync generator, video processing amplifier and color encoder circuit 5 of FIG. 1. The circuit 5 comprises a sync generator 42 of any suitable known type, a video processing amplifier 43 and a color encoder 44 of any suitable known type, all of which are commercially available.

The output of the sync generator 42 produces a 2 microsecond timing signal which is fed from its output to an input of a switching circuit 45 of the color encoder 44 via an electrical conductor 46. Program video from the output 2 of the video and audio input 1 of FIG. 1 is fed to the input of the video processing amplifier 43 via an input terminal 47 and an electrical conductor 48. The audio samples A1, A2 and A3 from the (L−R) sampler of the circuit 6 of FIG. 1 are fed to the color encoder 44 via input terminals 49, 50 and 51, respectively, and electrical conductors 52, 53 and 54, respectively, as shown in FIG. 5.

The video processing amplifier 43 produces an amplified video signal at its output which is fed to a second input of the switching circuit 45 of the color encoder 44 via an electrical conductor 55. The Red, Green and Blue color signals are fed to a second input of the switching circuit 45 of the color encoder 44 via an input terminal 56 and an electrical conductor 57 (FIG. 5). The switching circuit 45 produces a composite program video signal with encoded audio at its output 58.

The circuit 5 of FIG. 1 may comprise the sync generator, video processor disclosed in pending patent application Ser. No. 452,809 filed 12-23-82 of Frank Salvia.

The output 58 of the switching circuit 45 coincides with an output 59 of the circuit 5 of FIG. 1. Timing signals provided at a second output 60 of the circuit 5 are fed to a third input of the circuit 6. The signal provided by the circuit 5 at its output 59 is a video signal encoded with the difference audio signal (L−R). The sum signal (L+R) at the output 7 of the circuit 6 is fed to an input of an RF modulator 61 of any suitable type known in the art, which modulator is commercially available. The video signal encoded with the difference signal (L−R) at the output 59 of the circuit 5 is fed to a second input of the RF modulator 61.

The output of the RF modulator 61 is transmitted by wire or wireless to the receiver. In the embodiment of FIG. 1, the transmission is shown via wire or RF output line 62. In the receiver B, the transmitted output of the modulator 61 is fed to the antenna input of a color TV receiver 63. The TV receiver 63 may comprise any known color receiver of suitable type, which is commercially available. The TV receiver 63 has six outputs 64, 65, 66, 67, 68 and 69. The horizontal sync is provided at the first output 64 of the TV receiver 63 and is fed to a first input of a combined audio (L−R) desampler and L/R decoder circuit 70 via an electrical conductor 71.

A 3.58 mHz video sub-carrier is provided at the second output 65 of the TV receiver 63 and is fed to a second input of the circuit 70 via an electrical conductor 72. The Red, Green and Blue signals A1, A2 and A3, respectively, are provided at the fifth, fourth and third outputs 68, 67 and 66, respectively, of the TV receiver 63 and are fed to fifth, fourth and third inputs, respectively, of the circuit 70 via electrical conductors 73, 74 and 75, respectively, as shown in FIG. 1. The demodulated audio sum signal (L+R) is provided at the sixth output 69 of the TV receiver 63 and is fed to a sixth input of the circuit 70 via an electrical conductor 76.

The demodulated audio sum signal (L+R) provided at the output 69 of the TV receiver 63 is the standard monaural signal. The Red, Green and Blue signals A1, A2 and A3, respectively, provided at the outputs 68, 67 and 66, respectively, of the TV receiver 63 are fed to the audio (L−R) desampler of the circuit 70, which desampler may comprise the circuit shown in FIG. 6. The audio desampler of FIG. 6 comprises three sample and hold circuits 77, 78 and 79, a timing circuit 80, a filter 81 and an amplifier 82, each of which may comprise any suitable known circuit for providing the indicated results and each of which is commercially available.

Figure 6:
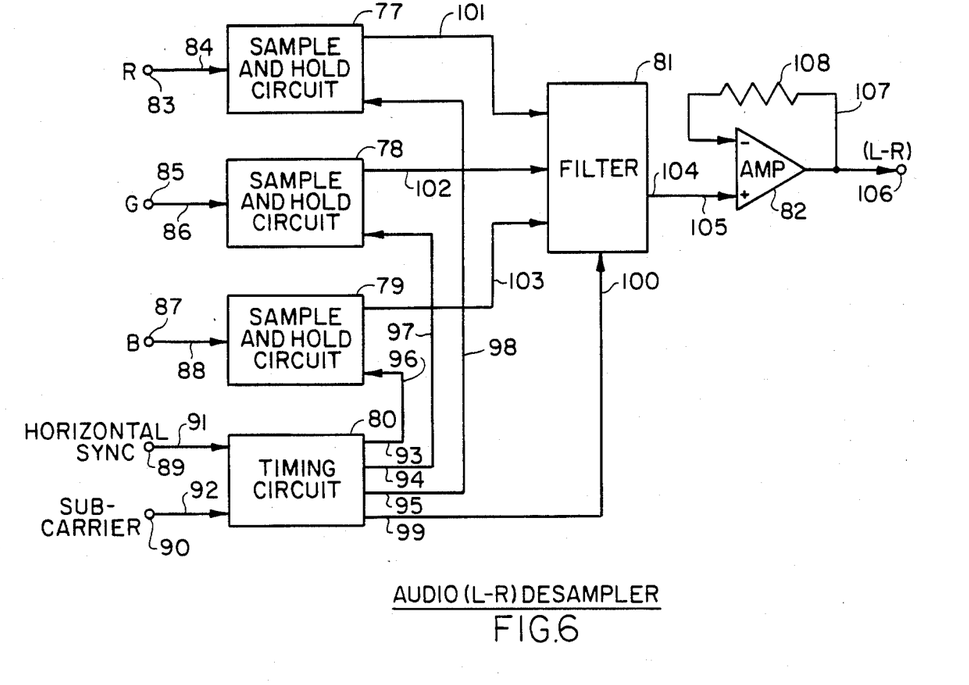
FIG. 6 is a block diagram of an embodiment of the audio (L−R) desampler of FIG. 1.

The Red signals are fed to an input of the sample and hold circuit 77 via an input terminal 83 and an electrical conductor 84. The Green signals are fed to an input of the sample and hold circuit 78 via an input terminal 85 and an electrical conductor 86. The Blue signals are fed to an input of the sample and hold circuit 79 via an input terminal 87 and an electrical conductor 88. The horizontal sync signals and the 3.58 mHz video sub-carrier are fed to first and second inputs, respectively, of the timing circuit 80 via input terminals 89 and 90, respectively, and electrical conductors 91 and 92, respectively. The horizontal sync and 3.58 mHz video sub-carrier provide the timing circuit with the synchronized timing necessary to recombine the three audio samples with a mutual spacing of 21 microseconds.

Figure 9:
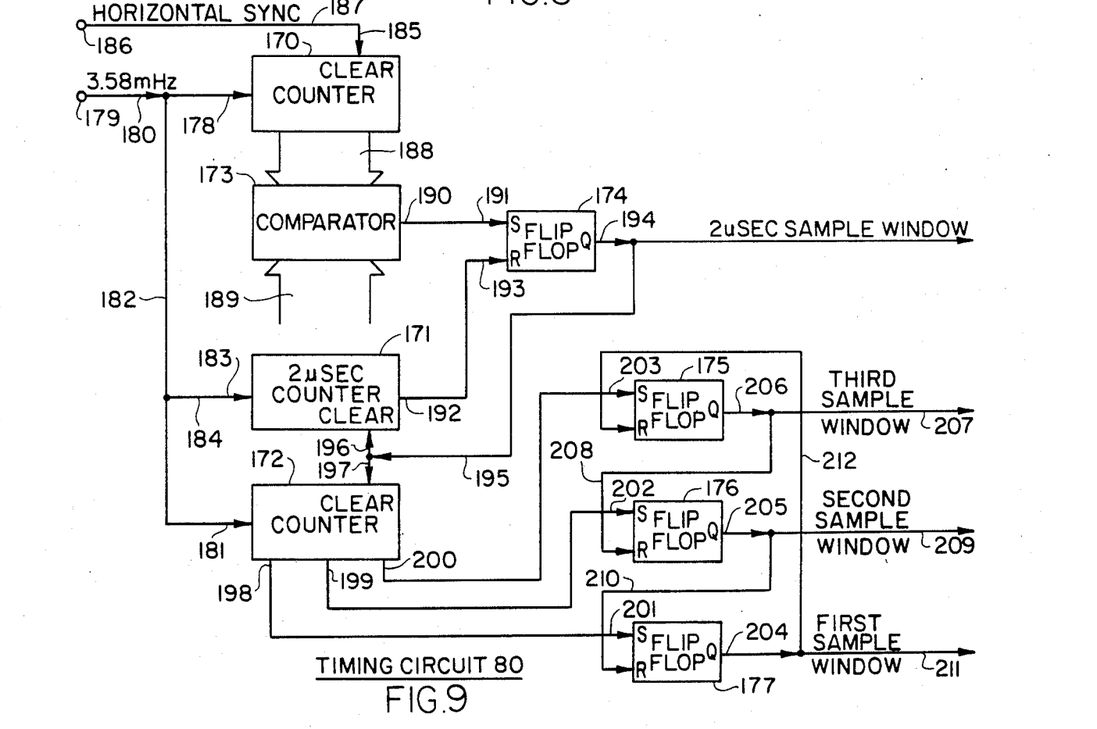
FIG. 9 is a block diagram of an embodiment of the timing circuit 80 of the audio (L−R) desampler shown in FIG. 6.

First, second and third outputs 93, 94 and 95 of the timing circuit 80 are fed to the second inputs of the sample and hold circuits 79, 78 and 77, respectively, via electrical conductors 96, 97 and 98, respectively. A fourth output 99 of the timing circuit 80 is fed to a first input of a filter 81 via an electrical conductor 100. The outputs of the sample and hold circuits 77, 78 and 79 are fed to second, third and fourth inputs, respectively, of the filter 81 via electrical conductors 101, 102 and 103, respectively. An embodiment of the timing circuit 80 is shown in FIG. 9 and is described hereinafter with reference to said FIG.

The filter 81 filters the recombined audio samples provided by the sample and hold circuits 77, 78 and 79, passes the difference signal (L−R), and feeds the passed difference signal provided at its output 104 to the positive input of the amplifier 82 via an electrical conductor 105. The amplified difference signal (L−R) is provided at the output of the amplifier 82 and is provided at an output terminal 106 and is fed back to the negative input of said amplifier via a feedback loop 107 which includes a resistor 108. The sum signal (L+R) provided at the output 69 of the TV receiver 63 and the difference signal (L−R) provided at the output terminal 106 of the audio (L−R) desampler of FIG. 6 are fed to the L/R decoder of the circuit 70 of FIG. 1.

Figure 7:
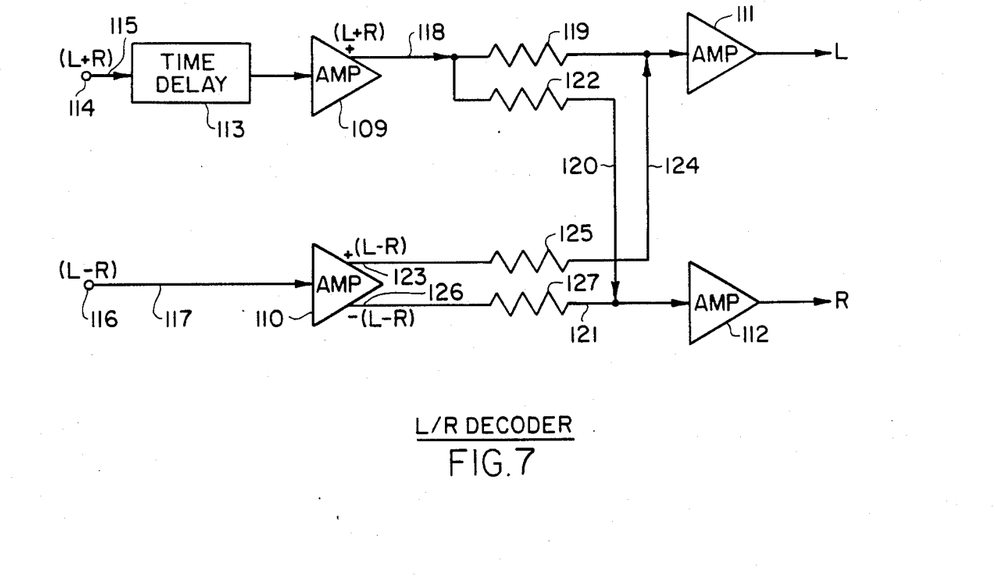
FIG. 7 is a block diagram of an embodiment of the L/R decoder of FIG. 1.

FIG. 7 shows an embodiment of the L/R decoder of the circuit 70 of FIG. 1. The L/R decoder of FIG. 7 comprises four amplifiers 109, 110, 111 and 112 and a time delay 113, all of which may comprise any suitable known circuits for accomplishing the desired results and all of which are commercially available. The sum signal (L+R) is fed to the input of the amplifier 109 via an input terminal 114, an electrical conductor 115 and the time delay 113. The difference signal (L−R) is fed to the input of the amplifier 110 via an input terminal 116 and an electrical conductor 117. The amplifier 109 provides the sum signal (L+R) at a positive output. The amplifier 110 provides the difference signal+(L−R) at a positive output and the difference signal−(L−R) at a negative output.

The sum signal (L+R) provided at the output of the amplifier 109 is fed to the input of the amplifier 111 via an electrical conductor 118 and a resistor 119 connected in said conductor in series between said output and said input. The sum signal (L+R) provided at the output of the amplifier 109 is also fed to the input of the amplifier 112 via the electrical conductor 118, electrical conductors 120 and 121 and a resistor 122 connected in the conductor 120 in series between said output and said input. The difference signal+(L−R) provided at the positive output 123 of the amplifier 110 is fed to the input of the amplifier 111 via an electrical conductor 124, the electrical conductor 118 and a resistor 125 connected in the conductor 124 in series between said output and said input. The difference signal−(L−R) provided at the negative output 126 of the amplifier 110 is fed to the input of the amplifier 112 via the electrical conductor 121 and a resistor 127 connected in said conductor in series between said output and said input.

The L signal is provided at the output of the amplifier 111 and the R signal is provided at the output of the amplifier 112, as shown in FIG. 7. The function of the time delay 113 in the (L+R) channel of the L/R decoder of FIG. 7 is to equal the processing delay in the (L−R) channel. The output of the amplifier 111 is a first output 128 of the circuit 70 of FIG. 1 and the output of the amplifier 112 is a second output 129 of said circuit. The L and R signals provided at the outputs 128 and 129, respectively, of the circuit 70 are fed to a stereo amplifier 130 of any suitable known type, which is commercially available, and thence to a left speaker 131 and a right speaker 132, respectively (FIG. 1), which reproduce the stereo sound. The speakers 131 and 132 may comprise any suitable known speakers and are commercially available.

An embodiment of the timing circuit 11 of the (L−R) sampler (FIG. 2) of the circuit 6 of FIG. 1 is shown in FIG. 8. The timing circuit 11 functions to divide 63.5 by 3. The timing circuit 11 comprises a binary counter 133, a 4 microsecond counter 134, three flip-flops 135, 136 and 137 and an OR gate 138, each of which components may comprise any suitable known, commercially available, circuit. A 3.58 mHz signal from the output 60 of the circuit 5 of FIG. 1 is fed to a first input 139 of the binary counter 133 via an input terminal 140 and an electrical conductor 141. The horizontal sync signal from the output 60 of the circuit 5 of FIG. 1 is fed to a second input 142 of the binary counter 133 via an input terminal 143 and an electrical conductor 144.

The 3.58 mHz signal is also fed to the input of the 4 microsecond counter 134 via the electrical conductor 141 and an electrical conductor 145. The binary counter 133, has first, second and third outputs 146, 147 and 148, respectively, at which a count of 1, a count of 76 and a count of 152, respectively, are provided. The horizontal sync signal is used to clear the counter 133 and start the counting process again. The 3.58 mHz signal is utilized as the clock signal in both counters 133 and 134.

The count of 1 provided at the first output 146 of the binary counter 133 is fed to the set input 149 of the flip-flop 137. The count of 76 provided at the second output 147 of the binary counter 133 is fed to the set input 150 of the flip-flop 136. The count of 152 provided at the third output 148 of the binary counter 133 is fed to the set input 151 of the flip-flop 135. The 4 microsecond counter 134 produces a 4 microsecond signal at a first output 152 which is fed to the reset inputs 153, 154 and 155 of the flip-flops 137, 136 and 135, respectively, via electrical conductors 156, 157 and 158, as shown in FIG. 8.

The count of 1 fed to the flip-flop 137 sets said flip-flop so that a first output sample window is produced at the output 159 of said flip-flop. The count of 76 fed to the flip-flop 136 sets said flip-flop so that a second output sample window is produced at the output 160 of said flip-flop. The count of 152 fed to the flip-flop 135 sets said flip-flop so that a third output sample window is produced at the output 161 of said flip-flop. The flip-flops 135, 136 and 137 are reset by the 4 microsecond signal fed to their reset inputs 155, 154 and 153, respectively. The first, second and third sample windows provided at the outputs 159, 160 and 161 of the flip-flops 137, 136 and 135, respectively, occur at different periods of time and have a 4 microsecond duration and said sample windows thereby achieve synchronization.

The output signal of the flip-flop 137 is fed to a first input of the OR gate 138 via electrical conductors 162 and 163. The output signal of the flip-flop 136 is fed to a second input of the OR gate 138 via electrical conductors 164 and 165. The output signal of the flip-flop 135 is fed to a third input of the OR gate 138 via electrical conductors 166 and 167. The output of the OR gate 138 is fed to a second input 168 of the 4 microsecond counter 134 via an electrical conductor 169 and enables said counter.

An embodiment of the timing circuit 80 of the audio (L−R) desampler (FIG. 6) of the circuit 70 of FIG. 1 is shown in FIG. 9. The timing circuit 80 comprises a counter 170, a 2 microsecond counter 171, a counter 172, a comparator 173 and flip-flops 174, 175, 176 and 177, any and all of which may comprise any suitable known circuits, commercially available. The timing information for the audio decoder is derived from two reference signals provided at the outputs 64 and 65 of the TV receiver 63 (FIG. 1). One of the reference signals which is a 3.58 mHz signal, is fed to a first input 178 of the counter 170 via an input terminal 179 and an electrical conductor 180, to a first input 181 of the counter 172 via said input terminal, said electrical conductor and an electrical conductor 182, and to a first input 183 of the 2 microsecond counter 171 via said input terminal, the electrical conductors 180 and 182 and an electrical conductor 184. The 3.58 mHz signals functions as a clock signal.

The horizontal sync signal is fed to a second input 185 of the counter 170 via an input terminal 186 and an electrical conductor 187 and functions to clear said counter. The counter 170 is thus reset during each horizontal sync interval of the TV picture. The counter 170 has a plurality of outputs 188 which are fed to a plurality of inputs of the comparator 173 and counts the 3.58 mHz signals until an output count of 214, is reached. The comparator 173 has a plurality of inputs 189 via which the count of 214 code is fed to said comparator. The output count of 214 from the counter 170 results in an equal-to comparison pulse by the comparator 173 at its output 190.

The count of 214 provided at the output 190 of the comparator 173 is fed to the set input 191 of the flip-flop 174. The 2 microsecond counter 171 has an output 192 at which it provides a 2 microsecond output signal which is fed to the reset input 193 of the flip-flop 174. The flip-flop 174 provides a 2 microsecond sample window at its output 194 and said sample window is fed to the sample and hold circuits 77, 78 and 79 of the audio (L−R) desampler of FIG. 6. The flip-flop 174 is reset by the 2 microsecond counter 171 at the end of the 2 microseconds sample window. The counter 171 is enabled and the counter 172 is cleared by the output of the flip-flop 174 via electrical conductors 195, 196 and 197.

The counter 172 is a binary counter and, similarly to the binary counter 133 of the timing circuit 11 of FIG. 8, provides a count of 1 at a first output 198, a count of 76 at a second output 199 and a count of 152 at a third output 200. The count of 1 provided at the first output 198 of the counter 172 is fed to the set input 201 of the flip-flop 177 and sets said flip-flop. The count of 76 provided at the second output 199 of the counter 172 is fed to the set input 202 of the flip-flop 176 and sets said flip-flop. The count of 152 provided at the third output 200 of the counter 172 is fed to the set input 203 of the flip-flop 175 and sets said flip-flop. When the flip-flop 177 is set, it provides a first sample window at its output 204. When the flip-flop 176 is set, it provides a second sample window at its output 205. When the flip-flop 175 is set, it provides a third sample window at its output 206.

When the flip-flop 175 provides a third sample window, it resets the flip-flop 176 via electrical conductors 207 and 208. When the flip-flop 176 provides the second sample window, it resets the flip-flop 177 via electrical conductors 209 and 210. When the flip-flop 177 provides the first sample window, it resets the flip-flop 175 via electrical conductors 211 and 212. The circuit 80 provides a train of three sample windows mutually spaced by 21 microseconds.

The first, second and third sample windows provided at the outputs 204, 205 and 206, respectively, of the flip-flops 177, 176 and 175, respectively, are utilized to demultiplex the captured audio samples the sample and hold circuits 77, 78 and 79 of the audio (L−R) desampler of FIG. 6.

The counts of 1, 76, 152 and 214 provided in the timing circuits 11 and 80 of FIGS. 8 and 9 refer to the counting of the clock signal of 3.58 mHz. Therefore, in order to determine the timing of the outputs of a counter, the count is multiplied by the clock period.

Although shown and described in what are believed to be the most practical and preferred embodiments, it is apparent that departures from the specific methods and designs described and shown will suggest themselves to those skilled in the art and may be made without departing from the spirit and scope of the invention. We therefore, do not wish to restrict ourselves to the particular constructions described and illustrated, but desire to avail ourselves of all modifications that may fall within the scope of the appended claims.

We claim:

1. A video color transmission system, comprising transmitter means for producing video and audio signals and transmitting said signals, said transmitter means including encoding means for encoding stereo audio signals with the video signals, said encoding means comprising an audio encoder for converting left and right microphone stereo audio signals L and R to a sum audio signal (L+R) of said left and right signals and a difference audio signal (L−R) of said left and right signals and (L−R) sampler means for sampling said difference audio signal (L−R) at a rapid rate, said (L−R) sampler means providing three samples within a horizontal time rate of 63.5 microseconds and said samples providing for a bandwidth of substantially 15 kHz; and
receiver means for converting signals received from said transmitter means to a color picture and stereo sound, said receiver means including decoding means for deriving said stereo audio signals from said received signals.

2. A video color transmission system, comprising transmitter means for producing video and audio signals and transmitting said signals, said transmitter means including encoding means for encoding multiple audio signals within the video signals, said encoding means comprising sampler means and a color encoder electrically connected to said sampler means and receiving the samples provided by said sampler means, as Red, Green and Blue inputs, a video processing amplifier electrically connected to said color encoder and a sync generator electrically connected to said color encoder, said color encoder, video processing amplifier and sync generator processing said samples into a composite video signal encoded with an audio signal; and
receiver means for converting signals received from said transmitter means to a color picture and audio signals, said receiver means recovering said Red, Green and Blue samples from the received composite video signal and including means for deriving said multiple audio signals from said received signals.

3. A video transmission system as claimed in claim 2, wherein said encoding means further comprises a switching circuit having program video and processed samples applied thereto, said switching circuit inserting said processed samples into a program video signal and providing said composite program video signal encoded with said difference audio signal.

4. A video transmission system as claimed in claim 2, wherein said means for deriving said multiple audio signals comprises audio desampler means for receiving Red, Green and Blue signals derived from, and corresponding to, said samples and converting said signals to an amplified audio signal.

5. A video transmission system as claimed in claim 4, wherein said audio desampler means includes a plurality of sample and hold circuits, a timing circuit electrically connected to said sample and hold circuits for causing said sample and hold circuits to provide recombined audio samples, a filter electrically connected to said sample and hold circuits and said timing circuit for passing the audio signal and an amplifier electrically connected to said filter for amplifying said audio signal.

6. A video color transmission system, comprising transmitter means for producing video and audio signals and transmitting said signals, said transmitter means including encoding means for encoding individual audio signals within the video signals, said encoding means comprising sampler means and a color encoder electrically connected to said sampler means and receiving the samples provided by said sampler means, as Red, Green and Blue inputs, a video processing amplifier electrically connected to said color encoder and a sync generator electrically connected to said color encoder, said color encoder, video processing amplifier and sync generator processing said samples into a composite video signal encoded with an audio signal; and
receiver means for converting signals received from said transmitter means to a color picture and audio signals, said receiver means recovering said Red, Green and Blue samples from the received composite video signal and including means for deriving said individual audio signals from said received signals.

7. A video transmission system as claimed in claim 6, wherein said encoding means further comprises a switching circuit having program video and processed samples applied thereto, said switching circuit inserting said processed samples into a program video signal and providing said composite program video signal encoded with said audio signal.

8. A video transmission system as claimed in claim 6, wherein said means for deriving said individual audio signals comprises audio desampler means for receiving Red, Green and Blue signals derived from, and corresponding to, said samples and converting said signals to an amplified audio signal.

9. A video transmission system as claimed in claim 8, wherein said audio desampler means includes a plurality of sample and hold circuits, a timing circuit electrically connected to said sample and hold circuits for causing said sample and hold circuits to provide recombined audio samples, a filter electrically connected to said sample and hold circuits and said timing circuit for passing the audio signal and an amplifier electrically connected to said filter for amplifying said audio signal.

10. A video color transmission system, comprising
transmitter means for producing video and audio signals and transmitting said signals, said transmitter means including encoding means for encoding stereo audio signals with the video signals, said encoding means comprising an audio encoder for converting left and right microphone stereo audio signals L and R to a sum audio signal (L+R) of said left and right signals and a difference audio signal (L−R) of said left and right signals and (L−R) sampler means for sampling said difference audio signal (L−R) at a rapid rate, said (L−R) sampler means of said encoding means including a plurality of sample and hold circuits and a timing circuit electrically connected to said sample and hold circuits for causing said sample and hold circuits to provide equally spaced samples approximately every 21 microseconds within the time period of a single horizontal line; and
receiver means for converting signals received from said transmitter means to a color picture and stereo sound, said receiver means including decoding means for deriving said stereo audio signals from said received signals.

11. A video transmission system as claimed in claim 10, wherein said encoding means further comprises a color encoder electrically connected to said (L−R) sampler means and receiving the samples provided by said sampler means, as Red, Green and Blue inputs, a video processing amplifier electrically connected to said color encoder and a sync generator electrically connected to said color encoder, said color encoder, video processing amplifier and sync generator processing said samples into a composite video signal encoded with a difference audio signal (L−R).

12. A video transmission system as claimed in claim 11, wherein said decoding means comprises audio (L−R) desampler means for receiving Red, Green and Blue signals derived from, and corresponding to, said samples and for converting said signals to an amplified difference audio signal (L−R).

13. A video transmission system as claimed in claim 16, wherein said audio (L−R) desampler means includes a plurality of sample and hold circuits, a timing circuit electrically connected to said sample and hold circuits for causing said sample and hold circuits to provide recombined audio samples, a filter electrically connected to said sample and hold circuits and said timing circuit for passing the difference audio signal (L−R) and an amplifier electrically connected to said filter for amplifying said difference audio signal.

14. A video transmission system as claimed in claim 15, wherein said encoding means further comprises a switching circuit having program video and processed samples applied thereto, said switching circuit inserting said processed samples into a program video signal and providing said composite program video signal encoded with said difference audio signal (L−R).

15. A video transmission system as claimed in claim 14, wherein said receiver further includes circuit means for recovering the sum audio signal (L+R) from said composite program video signal and wherein said decoding means further comprises an L/R decoder electrically connected to said receiver means for converting said amplified difference audio signal (L−R) and the sum audio signal (L+R) of said receiver means to said left and right microphone stereo audio signals L and R.

16. A video transmission system as claimed in claim 15, wherein said receiver further includes a stereo amplifier electrically connected to said L/R decoder means, a left speaker electrically connected to said stereo amplifier for reproducing said left audio signals L and a right speaker electrically connected to said stereo amplifier for reproducing said right audio signals R.

17. A video color transmission system comprising
transmitter means for producing video and audio signals and transmitting said signals, said transmitter means including encoding means for encoding stereo audio signals with the video signals, said encoding means comprising sampler means and a color encoder electrically connected to said sampler means and receiving the samples provided by said sampler means, as Red, Green and Blue inputs, a video processing amplifier electrically connected to said color encoder and a sync generator electrically connected to said color encoder, said color encoder, video processing amplifier and sync generator processing said samples into a composite video signal encoded with a difference audio signal; and
receiver means for converting signals received from said transmitter means to a color picture and stereo sound, said receiver means recovering said Red, Green and Blue samples from the received composite video signal and including means for deriving said stereo audio signals from said received signals.

18. A video transmission system as claimed in claim 17, wherein said means for deriving said stereo audio signals comprises audio desampler means for receiving Red, Green and Blue signals derived from, and corresponding to, said samples and converting said signals to an amplified difference audio signal.

19. A video transmission system as claimed in claim 18, wherein said audio desampler means includes a plurality of sample and hold circuits, a timing circuit electrically connected to said sample and hold circuits for causing said sample and hold circuits to provide recombined audio samples, a filter electrically connected to said sample and hold circuits and said timing circuit for passing the difference audio signal and an amplifier electrically connected to said filter for amplifying said difference audio signal.

20. A video transmission system as claimed in claim 17, wherein said encoding means further comprises a switching circuit having program video and processed samples applied thereto, said switching circuit inserting said processed samples into a program video signal and providing said composite program video signal encoded with said difference audio signal.

21. A video transmission system as claimed in claim 20, wherein said composite program video signal includes a sum audio signal (L+R) of left and right microphone stereo audio signals L and R and said receiver further includes circuit means for recovering the sum audio signal (L+R) from said composite program video signal and wherein said means for deriving said stereo audio signals further comprises an L/R decoder electrically connected to said receiver means for converting said amplified difference audio signal and the sum audio signal (L+R) of said receiver means to said left and right microphone stereo audio signals L and R.

22. A video transmission system as claimed in claim 21, wherein said receiver further includes a stereo amplifier electrically connected to said L/R decoder, a left speaker electrically connected to said stereo amplifier for reproducing said left audio signals L and a right speaker electrically connected to said stereo amplifier for reproducing said right audio signals R.

* * * * *